US006804412B1

(12) United States Patent
Wilkinson

(10) Patent No.: US 6,804,412 B1
(45) Date of Patent: Oct. 12, 2004

(54) OPTICAL CORRELATOR

(75) Inventor: Timothy David Wilkinson, Trumpington (GB)

(73) Assignee: Cambridge Correlators Limited, London (GB)

( * ) Notice: Subject to any disclaimer, the term of this patent is extended or adjusted under 35 U.S.C. 154(b) by 0 days.

(21) Appl. No.: 09/581,466

(22) PCT Filed: Dec. 11, 1998

(86) PCT No.: PCT/GB98/03707

§ 371 (c)(1), (2), (4) Date: Aug. 14, 2000

(87) PCT Pub. No.: WO99/31563

PCT Pub. Date: Jun. 24, 1999

(30) Foreign Application Priority Data

Dec. 12, 1997 (GB) ............................................ 9726386

(51) Int. Cl.[7] ................................................ G06K 9/64

(52) U.S. Cl. ....................... 382/278; 382/115; 382/124; 382/209; 382/219; 340/5.1; 340/5.52

(58) Field of Search ................................ 382/209, 216, 382/217, 218, 219, 278, 284, 291, 293, 295, 294, 115, 116, 124; 250/205, 559.04, 559.05; 358/537, 539, 540; 340/5.52, 5.53, 5.1

(56) References Cited

U.S. PATENT DOCUMENTS

| | | | | | |
|---|---|---|---|---|---|
| 5,024,508 | A | * | 6/1991 | Horner | 359/561 |
| 5,040,140 | A | | 8/1991 | Horner | 364/822 |
| 5,376,807 | A | * | 12/1994 | Liu et al. | 250/559.29 |
| 5,418,380 | A | * | 5/1995 | Simon et al. | 250/550 |
| 5,511,019 | A | | 4/1996 | Grycewicz et al. | 364/822 |
| 5,528,702 | A | * | 6/1996 | Mitsuoka et al. | 382/211 |
| 5,535,029 | A | * | 7/1996 | Clark | 349/96 |
| 5,619,596 | A | * | 4/1997 | Iwaki et al. | 382/278 |

FOREIGN PATENT DOCUMENTS

EP 0510540 A2 10/1992

OTHER PUBLICATIONS

Vallmitjana, S., et al., "Nonlinear filtering in object and Fourier space in a joint transform optical correlator: comparison and experimental realization", *Applied Optics 34 (20)* :3942–3949 (1995).

* cited by examiner

*Primary Examiner*—Bhavesh M. Mehta
*Assistant Examiner*—Yosef Kassa
(74) *Attorney, Agent, or Firm*—Hamilton, Brook, Smith & Reynolds, P.C.

(57) ABSTRACT

A method is described of optically performing a joint transform correlation starting from images displayed side-by-side on a spatial light modulator illuminated by a collimated light source. The image is focused by a lens onto a camera, the image is recorded by a frame grabber, and processed by a computer. By using a two pass process, the result is a measure of the correlation of the images. The images may be preprocessed in a phase-encoded chequerboard pattern and binarised by thresholding based on the average value of neighbouring pixels.

18 Claims, 5 Drawing Sheets

(a) (b)

OPTICAL CORRELATOR

CROSS-REFERENCE TO RELATED APPLICATIONS

This application is the U.S. National Stage of International Application No. PCT/GB98/03707, filed Dec. 11, 1998, published in English. The entire teachings of the above application are incorporated herein by reference.

BACKGROUND OF THE INVENTION

The invention relates to an optical correlator, for comparing images. Such devices can be used for optical recognition, for example for fingerprint recognition.

Several designs for optical correlators have been proposed. For example, Binary Phase-Only Matched Filter (BPOMF) based designs have been produced for a variety of applications. Correlation in a BPOMF is obtained by multiplying together the Fourier transform of the reference and input functions (r & s). This product is then Fourier transformed again to give the final correlation of r & s. In order to form the product in an optical system the input is displayed on one spatial light modulator and Fourier transformed with a lens. The reference r is Fourier transformed off-line and the result is converted to suit the type of spatial light modulator. The Fourier transform of s then passes through the spatial light modulator containing the Fourier transform of r giving the product. This is where the weakness of the system lies as the Fourier transform of s must be scaled and aligned with the reference to within one pixel at the spatial light modulator. Hence optical design and alignment of opto-mechanics are critical and very difficult to implement outside the laboratory. Another disadvantage of these systems is that the spatial light modulators (SLMs) used are too slow, difficult and expensive to obtain, or both.

Spatial light modulators based on ferroelectric liquid crystals are very fast and offer a potentially cheap technology for optical systems. However, they are limited by their binary modulation, i.e. by the ability of each cell only to display two states. Joint transform correlators using such devices are known from Guibert et al, “On-board optical transform correlator for road sign recognition”, Optical Engineering, Volume 34 (1995) page 135. This paper describes the use of ferroelectric liquid crystals with an optically addressed spatial light modulator.

However, such a correlator is difficult to construct and there are similar problems in optical design and mechanics as there are with the BPOMF. Also, optically addressed spatial light modulator (OASLM) technology has yet to become reliable and cannot deliver comparable performance to an electrically addressed silicon backplane spatial light modulator.

In a joint transform correlator (JTC), the input and reference images are displayed side-by-side on a display. In a so-called 1/f JTC, as described in J. L. Horner and C. K. Makekau ‘Two-focal-length optical correlator’, Applied Optics 28 (12) 1989, pp 2358–2367, the display is illuminated by collimated laser light and the side-by-side images are Fourier-transformed using a lens to form the joint power spectrum (JPS) as an intermediate image. Then, the intermediate image is non-linearly-processed and Fourier-transformed again, using the same or a different lens. The result gives a measure of the correlation between the input and reference images. In this prior-art JTC, the processing on the JPS was not designed to reduce the zero order light in the correlation plane. This was mostly due to the choice of display technology which restricts the modulation of the light to amplitude only. This device was also slow and could not be used to achieve high-speed correlation.

There is thus a need for an improved optical correlation method and correlator to alleviate these difficulties.

BRIEF SUMMARY OF THE INVENTION

According to the first aspect of the invention there is provided a method of optical correlation including the steps of modulating an input image and a reference image with a phase-encoded chequerboard pattern, displaying the modulated images side-by-side on a spatial light modulator, and performing a joint transform correlation on the displayed image.

The joint transform correlation is preferably performed by obtaining the joint power spectrum (JPS) corresponding to the Fourier transform of the input and reference images, and then obtaining a correlation image corresponding to the Fourier transform of the JPS. The correlation image contains information about the correlation between input and reference images.

The correlation is preferably performed by shining collimated light onto the spatial light modulator, forming an intermediate image of the spatial light modulator through a lens, recording and processing the intermediate image (JPS) and displaying the result on a spatial light modulator, shining collimated light onto the latter spatial light modulator, and recording a resulting correlation image of the spatial light modulator through a lens.

The advantage of carrying out the phase-encoding in a chequerboard pattern is that the collimated light passing straight through adjacent areas of the spatial light modulator, i.e. the zero-order light, destructively interferes. This greatly reduces the central zero-order spot of the image, and so helps reduce the contrast that the camera must record.

It is highly advantageous for the method to be a two-pass method, using only one spatial light modulator (SLM), lens and camera; in other words the SLMs and lenses mentioned are the same in each pass. Such a method comprises the steps of firstly displaying the reference and input images on the spatial light modulator and recording the intermediate image with a camera, secondly processing the intermediate image and thirdly displaying the processed intermediate image on the same spatial light modulator, and finally recording the correlation image with the camera to give an indication of the correlation between the input and reference images.

In alternative embodiments, two separate sets of modulators, lenses and cameras are used: this could operate slightly faster but would be more complex and expensive.

In one arrangement, the spatial light modulator (SLM) is a transmissive SLM, so that the light is transmitted through the SLM, through the lens and is then recorded by a camera located approximately one focal length behind the lens.

An alternative arrangement is to use a reflective spatial light modulator. In this arrangement reflected light is passed in the same way through the lens, reflected by the modulator and recorded by a camera.

Preferably the recorded image corresponds to the Fourier transform of the image displayed on the spatial light modulator. This is achieved by using collimated light and the arrangement of the camera one focal length behind the lens. Carrying out a Fourier transform twice on the side-by-side reference and input images gives a correlation image containing information about the correlation between the images. Of course, the Fourier transform will not be exact, since the camera can only record the intensity of the recorded light, not the phase, and background noise will always be present.

According to a second aspect of the invention there is provided a method of optical correlation for obtaining a correlation image corresponding to the correlation between an input and a reference image, including displaying the input and reference images on a spatial light modulator, and performing a joint transform correlation by shining collimated light onto the spatial light modulator, forming an intermediate image of the spatial light modulator through a lens, recording the intermediate image electronically as a plurality of pixels, binarising the intermediate image by thresholding each pixel using an average value of the surrounding pixels, displaying the binarised intermediate image on a spatial light modulator, shining collimated light onto the spatial light modulator, the aforesaid correlation image being the image through a lens of the intermediate image on the spatial light modulator. The intermediate image corresponds to the joint power spectrum of the reference and input images.

The method of binarising an image using the average value of the surrounding pixels is known, in crude edge detection methods, but has not previously been applied to joint transform correlation. The use of this method greatly enhances the correlation image by suppressing the zero order.

Preferably, the method of binarising the intermediate image is to threshold each pixel based on the mean value of each of the eight surrounding pixels. In other words, using $p_{ij}$ to indicate the value of the intermediate image pixel at (i,j), the binarised result $P'_{ij}$ is given by $$p'_{ij} = 1 \text{ if } p_{ij} > 1/8(p_{i-1,j-1} + p_{i-1,j} + p_{i-1,j+1} + p_{i,j-1} + p_{i,j+1} + p_{i+1,j-1} + p_{i+1,j} + p_{i+1,j+1}) - 1 \text{ otherwise.}$$

Preferably the method according to the second aspect is used in combination with modulating the input and reference images with a phase-encoded chequerboard pattern, as described above.

The second aspect may also encompass the other possibilities described above with reference to the first aspect.

According to a third aspect of the invention there is provided a joint transform correlator comprising an electrically addressed ferroelectric liquid crystal spatial light modulator (FLC SLM) for modulating collimated input light, a lens, a camera for capturing modulated light after it has passed through the lens and producing an signal corresponding thereto and a control means for recording the captured image and for addressing the ferroelectric liquid-crystal spatial light modulator, wherein the correlator is adapted to operate in a two-pass process to produce a correlation image from an input image and a reference image. Such correlators have not previously been realised, as far as the applicants are aware. It has not previously been known how such a system could produce correlation images in view of the binary phase nature of the display and without overloading the camera.

The ferroelectric liquid crystal modulator is preferably a binarising liquid crystal modulator with a plurality of pixels each of which can switch between two states outputting light in antiphase with respect to each other. The switching in such liquid crystal modulators is caused by applying an electrical signal to the pixel, and can be very fast: 20 kHz is easily possible. In embodiments, a transmissive ferroelectric liquid crystal spatial light modulator is used. The correlated light is passed directly through the spatial light modulator, the lens and then arrives at the camera where it is recorded.

The spatial light modulator may be a silicon back plane (reflective) SLM to allow a very small correlator, with a length of about 10 cm, compared to 50 cm in prior art arrangements. The optical components used may be made of plastics, for cheapness.

In alternative embodiments, a reflective ferroelectric liquid crystal spatial light modulator is used. The layout here is slightly difference, with a source of correlated light on the same side of the spatial light modulator as the lens. The principle is the same, in that collimated light is reflected by the spatial light modulator, passes through the ens and then arrives at the camera where it is recorded. Reflective ferroelectric devices with very small pixels are available, so these devices can be used to make a very compact and fast joint transform correlator.

Preferably, the control means is adapted to phase-encode the input image and the reference image using a chequerboard pattern, to display the images on the spatial light modulator, to take the recorded image, to process it and to display the processed image on the spatial light modulator, and in turn to output the correlation image.

Preferably, the control means is further adapted to binarise the intermediate image by using a 3×3 convolution kernel. This method thresholds each pixel based on the mean value of each of the eight surrounding pixels. In other words, using $P_{ij}$ to indicate the value of the intermediate image pixel at (i,j), the binarised result $P'_{ij}$ is given by $$p'_{ij} = 1 \text{ if } p_{ij} > 1/8(p_{i-1,j-1} + p_{i-1,j} + p_{i-1,j+1} + p_{i,j-1} + p_{i,j+1} + p_{i+1,j-1} + p_{i+1,j} + p_{i+1,j+1}) - 1 \text{ otherwise.}$$

Such a binarised spectrum gives good sharp correlation peaks and reduces zero order. This binarisation technique produces a roughly edge-enhanced binary version of the intermediate image. There is no zero order in the Fourier transform of the phase encoded input to swamp the camera. The non-linear process ensures that the binary phase intermediate image after thresholding has approximately equal numbers of +1 and −1 points. Hence, when the second Fourier transform is taken there is virtually no zero order (known as DC terms) in the correlation output which means that the detection of the correlation peaks with the CCD is easier and less susceptible to spurious noise peaks.

The camera can be any device that converts the pattern of light falling onto it into an electrical signal. In particular, a charge-coupled device (CCD) may be used, or alternatively a custom silicon photodiode array which can be designed as a smart detector array which also carries out the binarisation process.

The spatial light modulator, lens and camera are preferably arranged so that the image recorded by the camera corresponds to the Fourier transform of the image displayed by the spatial light modulator. For this, the camera is arranged at the focal point of the lens, whereby all the collimated light passing straight through the spatial light modulator ends up at a central spot of the camera. Broadly speaking, light that is diffracted at the spatial light modulator may end up elsewhere on the camera; the shorter the periodicity at the spatial light modulator the greater the angle of deflection of the first order diffraction pattern and hence the further the light ends up from the central spot. This conversion of periodicity at the spatial light modulator to different positions at the camera is a Fourier transform.

In order to display the input and reference images, they are first converted into a binary image of +1 and −1 states. Then the modulation in a phase-inversion chequerboard pattern is carried out. The images are multiplied by a chequerboard pattern of −1s and 1s to give an encoded input.

Further preferably, the chequerboard corresponds to pixels of the spatial light modulator; in other words, alternate pixels are inverted. The strong first-order diffraction peak is thereby moved outwards as far as possible.

The camera preferably has an aperture of dimensions such that it covers substantially all of the first order diffraction pattern of the image displayed on the spatial light modulator. When the chequerboard pattern corresponds to individual pixels then the strong first-order diffraction peaks are at the corners of the diffraction pattern because no smaller periodicity can be displayed. In order that these strong peaks do not overload the camera it may be advantageous to arrange the camera aperture to be slightly smaller than the size of the first-order diffraction pattern, to exclude these peaks.

Preferably, the control means is adapted to phase-encode the input image and the reference image, to display them on the spatial light modulator, to take the recorded image, to process it and to display the processed image on the spatial light modulator, and in turn to output the correlation image.

The camera can be any device that converts the pattern of light falling onto it into an electrical signal. In particular, a charge-coupled device (CCD) may be used, or photo-diode array.

In a particularly advantageous embodiment, a non-linear CMOS camera is used to capture the Fourier transform of the image. This has two advantages. Firstly, the camera can be made to image over five decades of intensity instead of the 256 gray-scale levels of a CCD camera. Since this more accurately matches the optical distribution of the Fourier spectrum, more information can be picked up. Even with binarisation, this increase the information content of the Fourier transform. The correlation peaks are much stronger and there is more flexibility in how the spectrum can be processed. Secondly, a CMOS detection array can operate at high speed. 2000 frames per second or more are possible. This is much faster than a CCD could deliver.

In embodiments a "smart pixel" array integrating the detector, frame grabber and computer could be used. The thresholding would be implemented on the smart pixel array itself, for example in hardware. This approach could readily be combined with a CMOS camera.

According to a fourth aspect of the invention there is provided a method of industrial inspection of products passing a video camera, comprising the steps of recording images of the individual products passing the video camera, displaying pairs of recorded images on a correlator as described above, and outputting the correlation between the pair of the recorded images as a measure of disturbances in the products.

This method allows the detection of defects even when there is no information about the object to be inspected. The current frame and previous frame are synchronised with the progress of objects through the system (in this example, roadsigns). If the sequence does not change, then the output correlations remain from frame to frame. When a change occurs (in this example a rotated roadsign), then the correlation between frames is interrupted. Moreover, the cycle of distortion can be detected by looking at the sequence of disturbances about the first detected defect. Even gradual distortions in the object can be picked up by correlating over multiples of frames to look for small changes. Most importantly, the whole process is done without ever knowing anything about the object being inspected.

BRIEF DESCRIPTION OF THE FIGURES

An embodiment of the invention will now be described, purely by way of example, with reference to the accompanying figures, in which.

Figure 3:
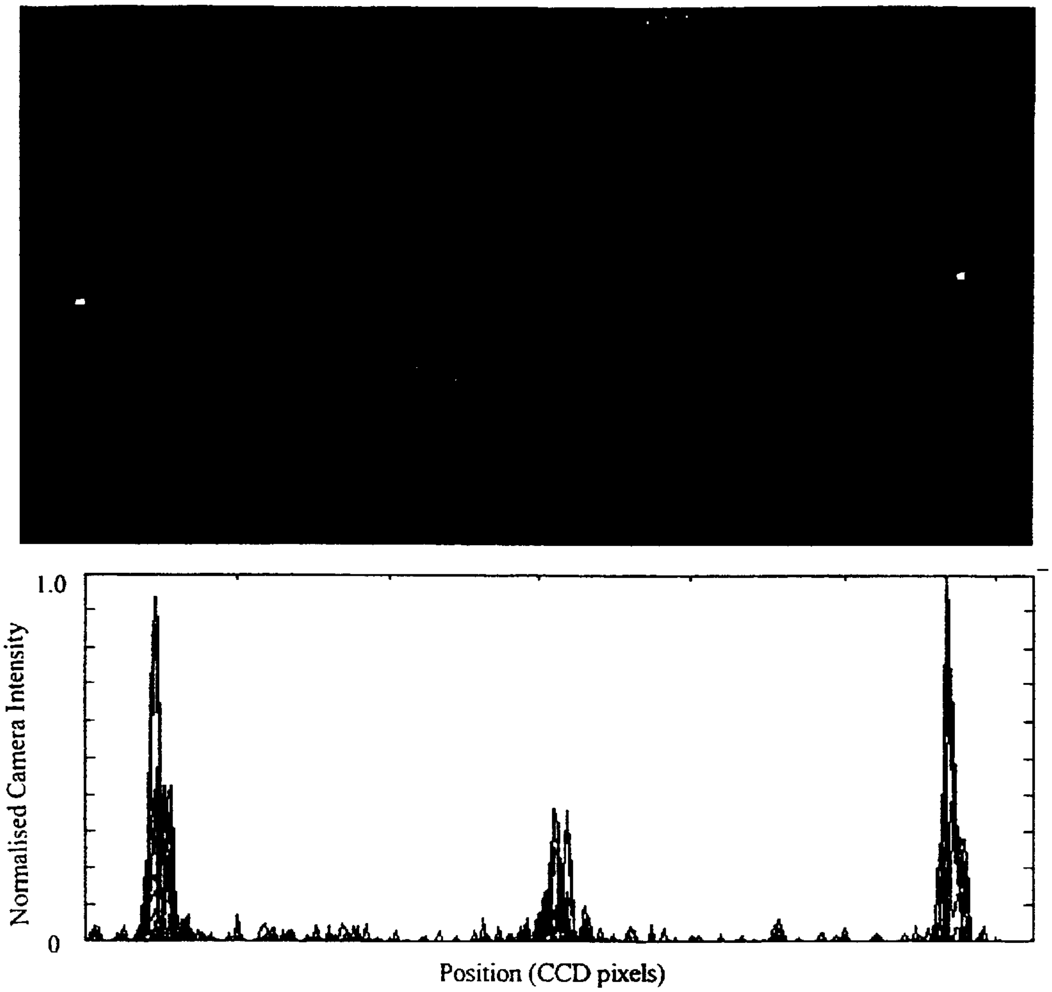

a) A spectrum grabbed by the CCD, and b) A 128×128 spectrum binarised by a nearest neighbour average;

FIG. 3: shows correlation plane results for the EE input plane; and

Figure 4:
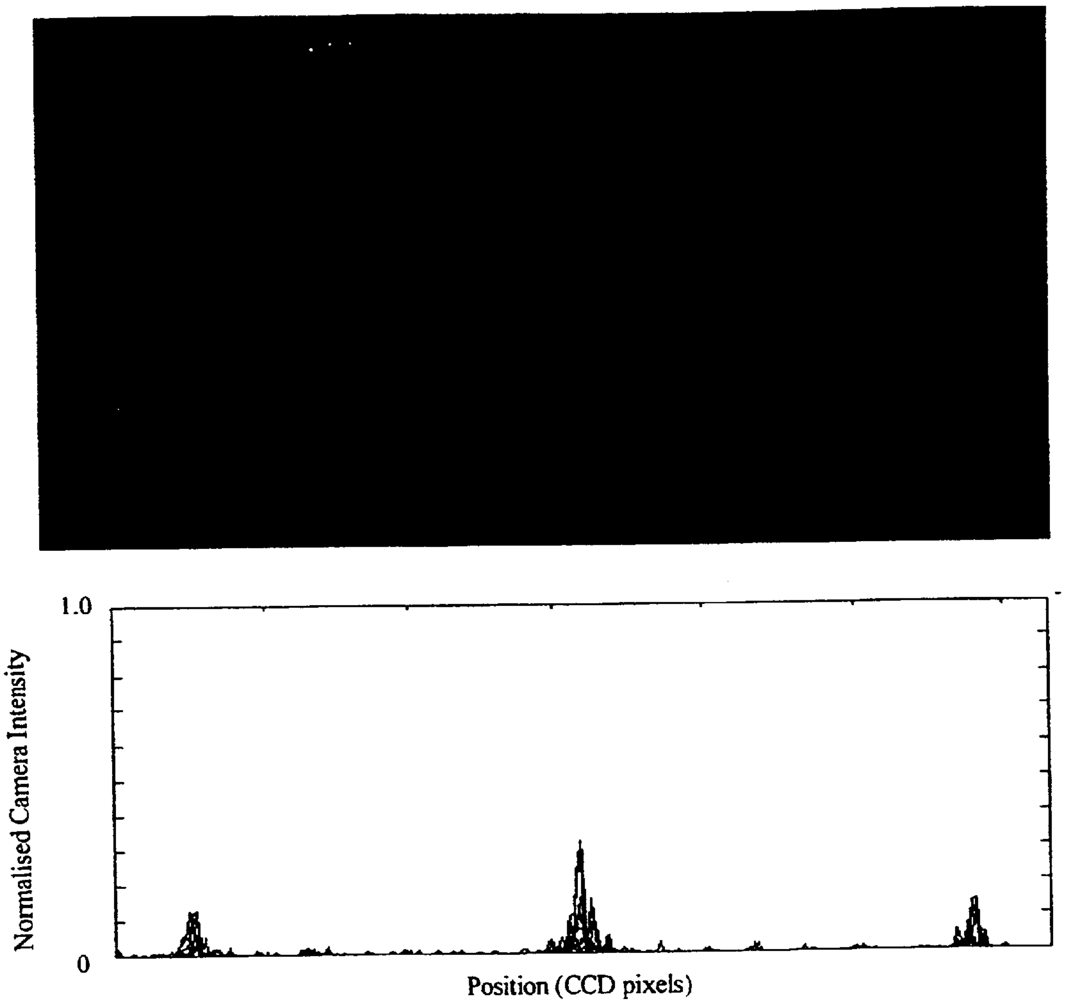
Figure 5:
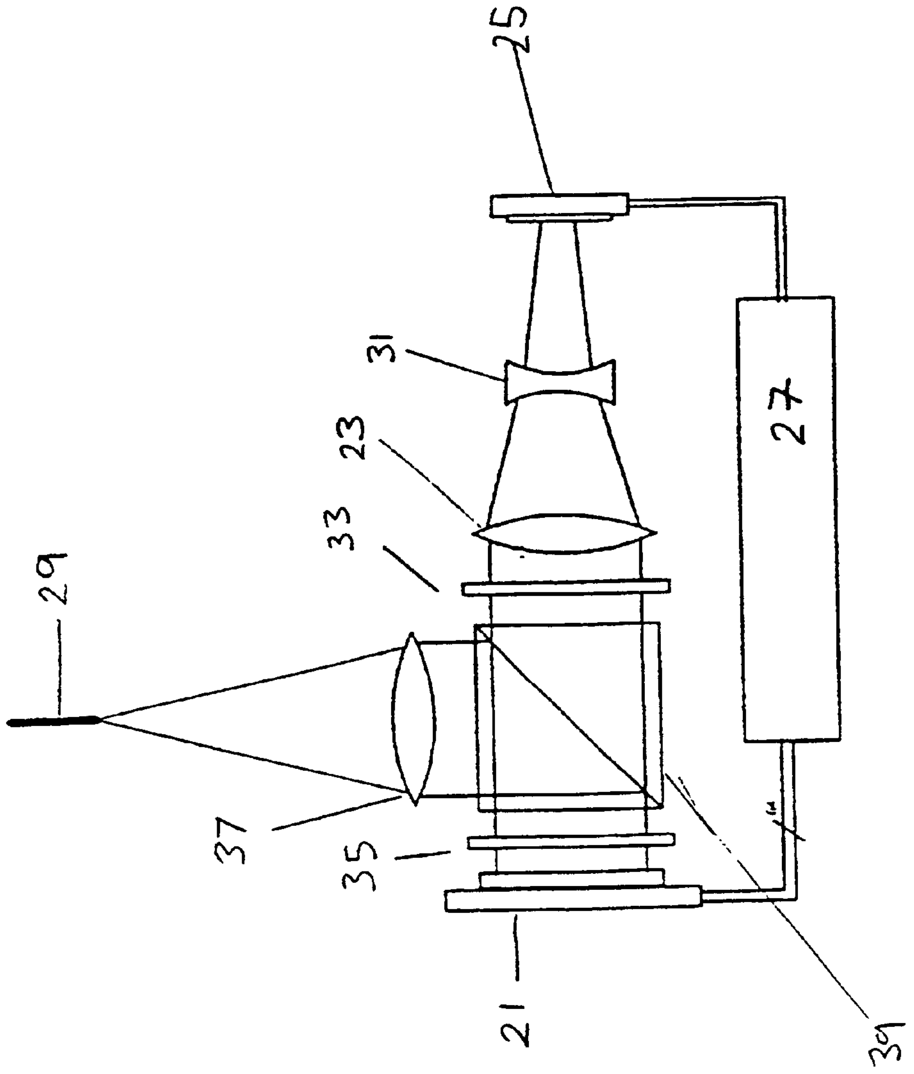

FIG. 4: shows correlation plane results for a comparative (EF) input plane; and FIG. 5: shows an embodiment of a small correlator according to the invention.

DETAILED DESCRIPTION OF THE INVENTION

As will be explained below, the correlation process is performed as follows:

(a) The intermediate image is placed beside the reference image.

(b) The whole image is converted to binary by first thresholding to [0, 1] and then shifting to [−1, 1].

(c) The whole image is multiplied by a single pixel chequerboard pattern.

(d) The image is displayed on the ferroelectric liquid crystal spatial light modulator (FLC SLM).

(e) The image is Fourier-transformed by the lens and captured on a CCD.

(f) The image on the CCD, known as the joint power spectrum (JPS) is thresholded based on nearest neighbours.

(g) The processed JPS is displayed on the FLM SLC.

(h) The JPS is Fourier-transformed and captured on the CCD as the correlation image.

Figure 1:
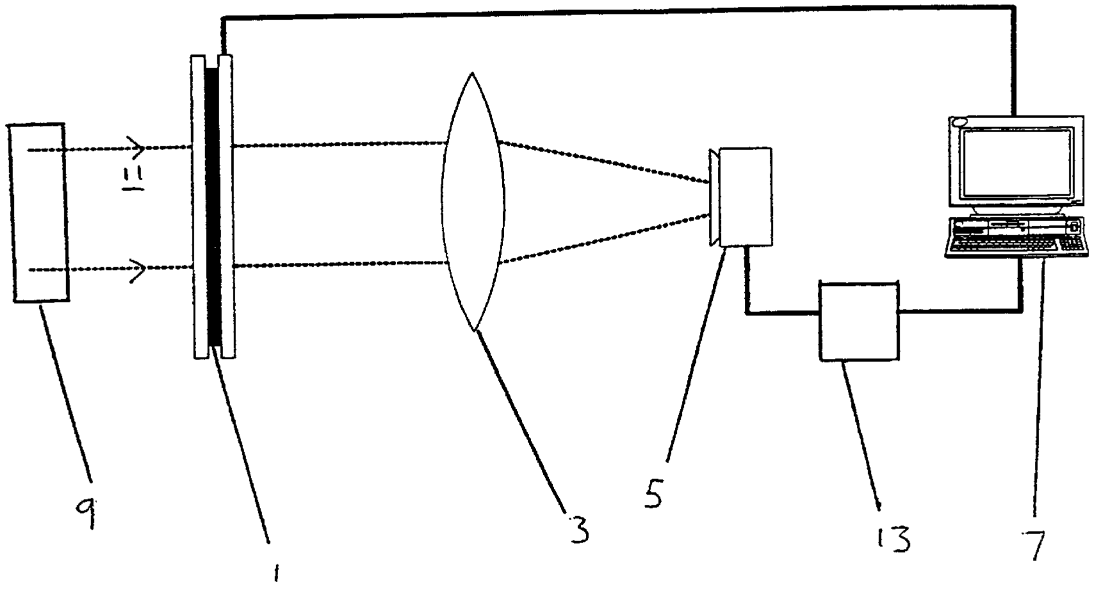
FIG. 1: shows a schematic view of the binary phase-only 1/f JTC in accordance with the invention.

The joint transform correlator (JTC) according to the embodiment is shown in FIG. 1. A 128×128 ferroelectric liquid crystal (FLC) 1 is used as the spatial light modulator (SLM). The lens 3 is a 250 mm focal length achromatic doublet, and the image is recorded using a camera, in this case a 768×548 charge coupled device (CCD) 5. A computer 7 controls the ferroelectric liquid crystal 1. A frame grabber 13 connected to the camera records the image and performs the image processing. A collimated HeNe laser 9 outputs collimated light 11. The laser operates at a wavelength of 633 nm.

The use of a binarised spectrum in a 1/f JTC is ideally suited for use with an FLC SLM. The nature of the FLC modulation is that it is restricted to two binary states, which can be switched by applying an electrical signal to each pixel. The switching of the liquid crystal can be considered as a half-wave plate with birefringent axes which can be rotated between two states. If the incoming light is polarised to bisect the positions of the two axes, and an analyzer is placed at 90° to the light, after the SLM, then binary phase modulation ([0, π] or [+1, −1]) is achieved, independent of FLC and SLM parameters such as thickness or switching angle. The binary restriction of the FLC means that the electro-optic effect is very fast, making SLM frame rates in excess of 2 kHz easily possible.

In use, the input and reference images are placed side by side and converted to binary by thresholding, i.e. values above a predetermined value are given the value 1 and lower values are given the value 0. The set of values [0, 1] is then converted to [−1 +1], for example by converting each 0 to a −1. The resulting image is then multiplied by a chequerboard pattern of −1s and 1s. The resulting phase-encoded side-by-side input and reference images are then displayed on the FLC SLM 1 which acts as a half wave plate, light passing through a pixel in the state −1 emerging out of phase with light passing through a pixel in the state +1.

The SLM is illuminated by a collimated laser beam output by the laser 9 and the images are Fourier-transformed by the single lens 3 at its focal plane. This spectrum is then captured by the CCD 5. If the reference image is r(x,y) and the input image is s(x,y), the image on the CCD will be $$P(u,v)=|R(u,v)+S(u,v)|^2,$$

where R(u,v) denotes the Fourier transform of r(x,y) and S(u,v) the Fourier transform of s(x,y). The term "spectrum" is used for the Fourier transforms, because the Fourier transform of a signal represents the spectrum of that signal. The spectrum P(u,v) is known as the joint power spectrum (JPS).

The spectrum is then non-linearly processed before being displayed on the SLM again to form the correlation information. The 1/f JTC is a two-pass system, using the same lens 3 to perform the second Fourier transform of the non-linearly processed JPS, which results in the correlation image containing information about the correlation between the input and reference images.

The reason for the non-linear processing is that if P above were directly Fourier- transformed, the result would be the two symmetrical correlation peaks characteristic of the JTC together with a huge zero-order peak located in the centre of the output plane. The correlation peaks would be very broad and the distinction between similar objects (such as a letter E and a letter F) would be very poor.

To avoid this problem, the quality of the correlation peaks is improved by non-linearly processing the joint power spectrum P. This also suits the available SLM technologies making it possible to display the JPS P. The processing can be done in a variety of ways, but strong sharp correlation peaks are generated by a 3×3 average convolution binarisation. The value of each pixel of P is thresholded on the basis of the mean of its nearest neighbours. In other words, for the i,jth pixel $P_{ij}$ in the spectrum P, the binarised result will be:

$$p'_{ij} = 1 \text{ if } p_{ij} > 1/8(p_{i-1,j-1} + p_{i-1,j} + p_{i-1,j+1} + p_{i,j-1} + p_{i,j+1} + p_{i+1,j-1} + p_{i+1,j} + p_{i+1,j+1}) - 1 \text{ otherwise.}$$

Such a binarised spectrum produces good sharp correlation peaks and reduced zero order. If the binarised spectrum is converted to binary phase modulation [−1, +1], then the zero order is reduced to around the height of the correlation peaks. The reduction of the zero order is due to the fact that the 3×3 convolution is a form of edge enhancement, which picks up any correlation-based interference patterns in the spectrum. The zero order peak is proportional to the average value over the pattern, so if there are an equal number of −1s and +1s, the zero order will be zero. This can be ensured by subsequently processing the threshold spectrum with a chequerboard pattern as described above.

However, the system also enhances the background noise. Luckily, any interference patterns will lead to correlation peaks, whilst the background noise will be spread evenly throughout the background since the Fourier transform of random noise is random noise.

Initial tests were performed with two letter Es displayed side by side in binary phase mode on the SLM as input and reference images. The resulting image was difficult to record because of the huge dynamic range of the Fourier transform, surpassing the available 8 bits of the CCD array and saturating the camera. A stop was tried, which blocked out the central portion of the spectrum, but this was not very effective.

Figure 2:
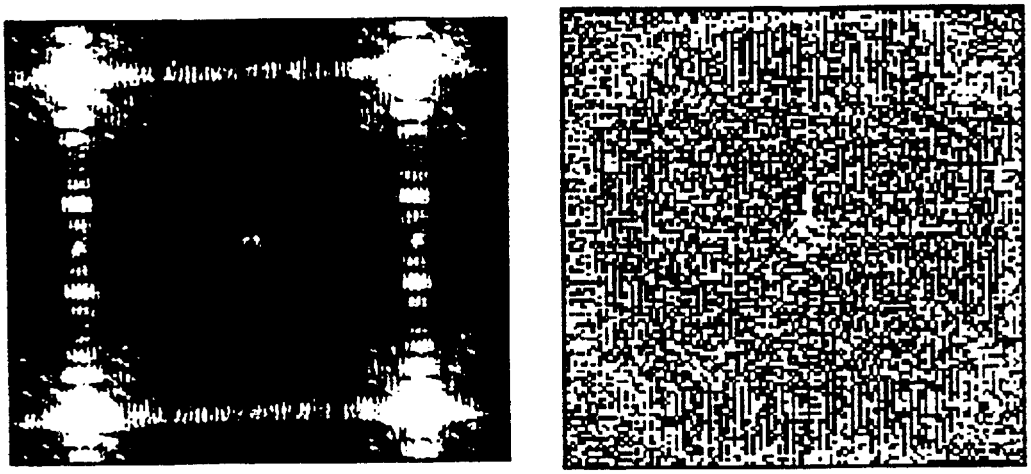
FIG. 2: shows spectrum processing for a trial (E/E) input plane.

Then the arrangement according to the invention was tried, which reduced the effects of the limited dynamic range. A holographic shift was performed by multiplying the input plane pixel by pixel with an alternate-pixel binary-phase chequerboard pattern and displaying the result on the SLM. This moved the peak of the intensity to the four corners of the Fourier plane. The spectrum for the Es can be seen in FIG. 2*a*. The multiplication of the input plane by the chequerboard ensures that the same number of −1 and +1 states (half of each) are always present in the input, independently of the reference and input images. Hence, there will be no zero order present in the input and the dynamic range of the Fourier transform will be greatly reduced making it possible to produce the image seen in FIG. 2*a*.

The spectrum was then taken from the camera as a 320×320 pixel image and processed by the frame grabber. Various processing schemes were tried with the frame grabber, with some success. The 3×3 convolution binarisation scheme proved the best as it produced an image with nearly equal numbers of −1 and +1 states for a wide variety of input patterns, which is ideally suited to an FLC SLM. The binarised spectrum was then reduced to 128×128 pixels to suit the SLM 1 used in the experiment. The spectrum in FIG. 2*a* can be seen after binarisation in FIG. 2*b*. The kernel for the binarisation of the spectrum is very simple to write in software, so the processing was very quick (around 1 msec for this experimental test on the frame grabber).

The binarised spectrum was then displayed on the same FLC SLM as the input without altering the experimental set-up. The correlation plane is shown in FIG. 3 as an two-dimensional image and as a 1-dimensional profile of the peaks seen along a line through the peaks. No processing of the correlation plane was necessary to reduce the zero order and the CCD did not saturate. The zero order peak was measured at 3.3 dB, part of which was due to imperfections in the SLM such as thickness variations, spacers and image update addressing.

The letter F was then used as the input image (with the letter E as the reference) and the process repeated without altering the experimental arrangement. The resultant correlation plane can be seen in FIG. 4. The correlation for the F input image was 8.8 dB less than for the E which provided excellent differentiation between the two closely correlated inputs. Further letters were also tested (H, O and R) against the E: in these cases the correlation could not be detected above the noise. The system thus displays excellent selectivity. Multiple combinations of Es and Fs were also tried as inputs with similar results to those shown in FIGS. 3 and 4.

The results presented show that the binary phase-only 1/f JTC based on a FLC SLM can provide high-quality correlation performance. The results show that the technique of phase encoding the input plane with a binary phase chequerboard greatly improves the ability to image the spectrum on a CCD camera. The technique proposed to binarise the spectrum is also ideally suited to this system as it produces nearly equal binary phase state images, which eliminates the output plane zero order, making detection simpler and providing more freedom in the output plane. The combination of these two techniques with an FLC SLM has demonstrated the technique under an input set of alphabetical characters. The technique provides good sharp correlation peaks, with very low zero order and greatly improved discrimination between closely correlated images. A simple frame grabber is sufficient, because the invention means that it is not necessary to record images with very large dynamic ranges. It is clear that the processing can be efficiently implemented because the binarisation uses a simple process that can be easily carried out using computers, which allows correlation rates to be limited by the frame rate of the SLM. The overall performance of the correlator could be improved by using an FLC-based silicon backplane SLM to allow high frame rates and to reduce the overall dimensions of the system to a more feasible and compact size.

FIG. 5 shows how such a system can be arranged. A fast silicon backplane 21 acts as the spatial light modulator. Light from a fibre pigtail laser 29 is focused by a lens 37 onto a beam splitter 39, and illuminates the silicon backplane 21 through a half-wave plate 35. The reflected and modulated light passes through a polarizer 33, lenses 23, 31 and is recorded by a camera 25. Electronics 27 acts as a frame-grabber and processor.

The frame grabber could also be replaced with a custom designed silicon detector. Each pixel value could in this case be thresholded on the silicon itself on a nearest-neighbour pixel basis before direct transfer back onto the SLM for the second pass through the system. Such a design would be more suitable for a commercial device than the embodiment having a frame grabber described above. The thresholding can be carried out electronically in circuits on the chip.

What is claimed is:

1. A method of optical correlation between an input image and a reference image, including the steps of:

Optically performing a joint transform correlation between an input image and a reference image;

displaying the two images side by side as a binary phase image;

modulating the resulting binary phase image with a phase-encoded checkerboard pattern;

displaying the modulated image on a spatial light modulator;

illuminating by a constant light source the spatial light modulator; and performing a joint transform correlation on the displayed image, the correlation including binarising an intermediate image by thresholding each pixel using values of its surrounding pixels.

2. A method according to claim 1 in which the joint transform correlation is performed by:

obtaining the joint power spectrum (JPS) corresponding to the Fourier transform of the input and reference images, and then obtaining a correlation image containing information about the correlation between input and reference images by taking the Fourier transform of the JPS.

3. A method according to claim 1, wherein the step of performing a joint transform correlation comprises:

shining collimated light onto the spatial light modulator;

forming an intermediate image of the modulated image on the spatial light modulator through a lens;

recording and processing the intermediate image;

displaying the result on a spatial light modulator;

shining collimated light onto the latter spatial light modulator; and recording a resulting correlation image of the spatial light modulator through a lens.

4. A method according to claim 1, further comprising the steps of:

forming the intermediate image of the displayed modulated image and recording it with a camera;

processing the intermediate image;

displaying the processed intermediate image on the same spatial light modulator; and recording the correlation image with the camera to give an indication of the correlation between the input and reference images.

5. A method according to claim 4, further including a step of binarising the intermediate image by thresholding each pixel on the basis of the average value of the surrounding pixels.

6. A method of optical correlation for obtaining a correlation image corresponding to the correlation between an input and a reference image by displaying the input and reference images on a spatial light modulator, and performing a joint transform correlation, including the steps of:

shining collimated light onto the spatial light modulator;

forming an intermediate image of the spatial light modulator through a lens;

recording the intermediate image electronically as a plurality of pixels;

binarising the intermediate image by thresholding each pixel using a value of the surrounding pixels;

displaying the binarised intermediate image on a spatial light modulator; and shining collimated light onto the spatial light modulator, to obtain the correlation image being the image through a lens of the intermediate image on the latter spatial light modulator.

7. A method according to claim 6, in which the step of binarising the intermediate image is performed by thresholding each pixel on the basis of the mean value of each of the eight surrounding pixels.

8. A joint transform correlator comprising:

an electrically addressed spatial light modulator (SLM) for modulating collimated input light by an input image and a reference image;

a lens;

a camera for capturing modulated light after it has passed through the lens and for producing a signal corresponding thereto; and a control means for recording the captured image from the modulator and for addressing the spatial light modulator;

wherein the correlator is adapted to operate in a two-pass process to produce a correlation image from the input image and the reference image;

characterized in that the control means is adapted to phase-encode the input image and the reference image using a checkerboard pattern before displaying them on the spatial light modulator.

9. A joint transform correlator according to claim 8, wherein the spatial light modulator is a ferroelectric liquid crystal modulator.

10. A correlator according to claim 9, wherein the ferroelectric liquid-crystal modulator is a binarising liquid crystal modulator with a plurality of pixels each of which can switch between two states outputting light in antiphase with respect to each other.

11. A correlator according to claim 8, wherein the control means is adapted to take the recorded image, to process it and to display the processed image on the spatial light modulator in a second pass, and in turn to output the correlation image.

12. A correlator according to claim 11, wherein the control means is further adapted to binarise the intermediate image by thresholding each pixel on the basis of the mean value of the eight surrounding pixels.

13. A correlator according to claim 8, wherein the camera is a non-linear CMOS detector array.

14. A correlator according to claim 8, wherein the camera is arranged at the focal point of the lens, so that the image recorded by the camera corresponds to the Fourier transform of the image displayed by the spatial light modulator.

15. A method of inspection of products passing a video camera, comprising the steps of:

recording images of the individual products passing the video camera;

displaying pairs of recorded images as input and reference images on a correlator according to claim 8; and outputting the correlation between the pair of the recorded images as a measure of disturbances in the products.

16. A joint transform correlator comprising:

an electrically addressed spatial light modulator (SLM) for modulating collimated input light by an input image and a reference image;

a lens;

a camera for capturing modulated light after it has passed through the lens and for producing a signal corresponding thereto; and a control means for recording the captured image from the modulator and for addressing the spatial light modulator;

wherein the correlator is adapted to operate in a two-pass process to produce a correlation image from the input image and the reference image;

characterised in that the control means is further adapted to binarise the intermediate image by thresholding each pixel on the basis of the mean value of the eight surrounding pixels.

17. A joint transform correlator comprising:

an electrically addressed, binarising, ferroelectric liquid crystal modulator with a plurality of pixels each of which can switch between two states outputting light in antiphase with respect to each other for modulating collimated input light by an input image and a reference image;

a lens;

a camera for capturing modulated light after it has passed through the lens and for producing a signal corresponding thereto; and a control means for recording the captured image from the modulator and for addressing the ferroelectric liquid-crystal spatial light modulator;

wherein the correlator is adapted to operate in a two-pass process to produce a correlation image from the input image and the reference image;

characterized in that the control means is adapted to phase-encode the input image and the reference image using a checkerboard pattern before displaying them on the spatial light modulator.

18. A joint transform correlator comprising:

an electrically addressed spatial light modulator (SLM) for modulating collimated input light by an input image and a reference image;

a lens;

a camera for capturing modulated light after it has passed through the lens and for producing a signal corresponding thereto; and a control means for recording the captured image from the modulator and for addressing the ferroelectric liquid-crystal spatial light modulator, the control means being adapted to take the recorded image, to process it and to display the processed image on the spatial light modulator in a second pass, and in turn to output the correlation image;

wherein the correlator is adapted to operate in a two-pass process to produce a correlation image from the input image and the reference image;

characterized in that the control means is adapted to phase-encode the input image and the reference image using a checkerboard pattern before displaying them on the spatial light modulator.

* * * * *

UNITED STATES PATENT AND TRADEMARK OFFICE

CERTIFICATE OF CORRECTION

PATENT NO. : 6,804,412 B1 Page 1 of 1
DATED : October 12, 2004
INVENTOR(S) : Timothy David Wilkinson It is certified that error appears in the above-identified patent and that said Letters Patent is hereby corrected as shown below:

Column 9,
Line 51, delete "constant" and insert -- collimated --.

Signed and Sealed this

Twenty-eighth Day of December, 2004

JON W. DUDAS
*Director of the United States Patent and Trademark Office*